United States Patent
Froderman et al.

(10) Patent No.: US 10,980,263 B2
(45) Date of Patent: *Apr. 20, 2021

(54) BIO-BASED OIL COMPOSITION AND METHOD FOR PRODUCING THE SAME

(71) Applicant: Solenis Technologies L.P., Wilmington, DE (US)

(72) Inventors: Christopher S. Froderman, Avon, IN (US); William C. Hildebrand, Indianapolis, IN (US)

(73) Assignee: SOLENIS TECHNOLOGIES, L.P., Wilmington, DE (US)

(*) Notice: Subject to any disclaimer, the term of this patent is extended or adjusted under 35 U.S.C. 154(b) by 50 days.

This patent is subject to a terminal disclaimer.

(21) Appl. No.: 15/969,133

(22) Filed: May 2, 2018

(65) Prior Publication Data

US 2018/0242626 A1    Aug. 30, 2018

Related U.S. Application Data

(63) Continuation of application No. 14/627,618, filed on Feb. 20, 2015, now abandoned, which is a continuation of application No. 13/117,301, filed on May 27, 2011, now Pat. No. 8,962,059.

(51) Int. Cl.
| | |
|---|---|
| *A23L 29/00* | (2016.01) |
| *C11B 3/16* | (2006.01) |
| *C11B 13/00* | (2006.01) |
| *A23K 10/38* | (2016.01) |
| *C11B 1/10* | (2006.01) |

(52) U.S. Cl.
CPC .............. *A23L 29/04* (2016.08); *A23K 10/38* (2016.05); *C11B 1/10* (2013.01); *C11B 3/16* (2013.01); *C11B 13/00* (2013.01); *A23V 2002/00* (2013.01); *Y02P 60/87* (2015.11); *Y02W 30/74* (2015.05)

(58) Field of Classification Search
CPC .. C11B 3/16; C11B 13/00; C11B 1/10; A23K 10/38; A23L 29/04; Y02W 30/74; A23V 2002/00; Y02P 60/873
See application file for complete search history.

(56) References Cited

U.S. PATENT DOCUMENTS

| | | |
|---|---|---|
| 2,663,718 A | 12/1953 | Strezynski |
| 5,250,182 A | 10/1993 | Bento et al. |
| 5,662,810 A | 9/1997 | Willgohs |
| 5,795,477 A | 8/1998 | Herman et al. |

(Continued)

OTHER PUBLICATIONS

Singh, N., et al., "Extraction of Oil From Corn Distillers Dried Grains With Solubles," Transactions of the ASABE, vol. 41, No. 6, Nov./Dec. 1998, pp. 1775-1777.

(Continued)

*Primary Examiner* — Subbalakshmi Prakash
(74) *Attorney, Agent, or Firm* — Lorenz & Kopf, LLP

(57) ABSTRACT

A method of extracting oil from a byproduct stream of a bio-based ethanol production process and a organic composition resulting from the method is provided. The method includes applying an oil concentrator to a byproduct stream, mixing the oil concentrator with the byproduct stream, and separating the oil from the byproduct stream. An organic composition comprising oil derived from a byproduct stream of a bio-based ethanol production process and an oil concentrator is also provided.

14 Claims, 5 Drawing Sheets

(56) References Cited

U.S. PATENT DOCUMENTS

| | | |
|---|---|---|
| 6,433,146 B1 | 8/2002 | Cheryan |
| 7,601,858 B2 | 10/2009 | Cantrell et al. |
| 7,608,729 B2 | 10/2009 | Winsness et al. |
| 2003/0180415 A1 | 9/2003 | Stiefel et al. |
| 2004/0087808 A1 | 5/2004 | Prevost et al. |
| 2005/0155282 A1 | 7/2005 | Siggelkow et al. |
| 2006/0006116 A1 | 1/2006 | Scheimann et al. |
| 2008/0110577 A1 | 5/2008 | Winsness |
| 2008/0125612 A1 | 5/2008 | Bruckmayer |
| 2009/0227004 A1 | 9/2009 | Dale |
| 2009/0293344 A1 | 12/2009 | O'Brien et al. |

OTHER PUBLICATIONS

"The HLB System a Time-Saving Guide to Emulsifier Selection," © 1976 ICI United States, Inc., 22 pages.

Becher, Paul, Emulsions: Theory and Practice, Reinhold Publishing, New York, © 1957, Chapter 6, "The Chemistry of Emulsifying Agents," pp. 209-265.

Watkins, Catherine, "Two Fuels From One Kernel," Inform, vol. 18, No. 11, Nov. 2007, pp. 714-718.

Lumisorb PSTS-20 K (Polysorbate 65) Technical Data Sheet, Lambent Technologies, © 2006, 2 pages.

Lumisorb PSMO-20K (polysobate 80) Technical Data Sheet, Lambent Technologies, © 2004, 2 pages.

GreenShift Corporation Corn Oil Extraction Process Description (online), © 2005-2010, http://www.greenshift.com/cornoil.php?mode=2, 2 pages.

FDA Part 172, Code of Federal Regulations, Title 21, Part 172 (online), undated, http://www.accessdata.fda.gov/scripts/cdrh/cfdocs/cfCFR/CFRsearch.cfm?CFRPart=172, 5 pages.

BIO-BASED OIL COMPOSITION AND METHOD FOR PRODUCING THE SAME

CROSS-REFERENCE TO RELATED APPLICATION

This application is a continuation of U.S. application Ser. No. 14/627,618, filed on Feb. 20, 2015, which is a continuation of patent application Ser. No. 13/117,301, filed May 27, 2011, now U.S. Pat. No. 8,962,059, issued Feb. 24, 2015, the disclosures of which are incorporated herein by reference in their entireties.

BACKGROUND OF THE INVENTION

This invention relates to a plant oil product and methods of producing the product from a bio-based ethanol byproduct stream, and more particularly to a corn oil product and methods of recovering the corn oil product from a dry milling process for obtaining ethanol from corn.

The global production of ethanol from biologically based (bio-based) sources has recently expanded significantly. While the production of ethanol from petroleum sources remains, the ethanol supply is now primarily produced from renewable sources. The dry grind ethanol production process, using corn, is presently the primary source of ethanol in the United States. While the fermentation of sugars to produce alcohol is one of humanity's earliest and arguably most important discoveries, its implementation to mass producing ethanol for fuel has occurred relatively recently. The ethanol produced from corn is considered renewable because the growth of corn does not destroy the resources that it needs to produce compounds (e.g. starches and sugars) which can be treated enzymatically then fermented to produce ethanol.

The manufacture of ethanol from bio-based sources does not completely consume the bio-based material. Instead, there are typically considerable quantities of byproducts remaining after the fermentable sugars are converted into ethanol. Depending on the bio-based source, these byproducts may be quite valuable. For example, the production of ethanol from corn using the dry mill production process results in a byproduct stream that is used primarily as an animal feed (dry distillers grains (DDG) or wet distillers grain (WDG)).

Bio-based sources for the production of ethanol often include significant proportions of oils. For example, most crop plants contain some amount of oils. The oils in plants are primarily triglycerides. As such, they are not fermentable and remain in the byproduct stream through the ethanol manufacturing processes. Further, bio-based sources may be modified to increase the proportion of the source that is oil. For example, plant breeders began attempting to modify the oil content of corn in studies that date back to the turn of the 20$^{th}$ century. In the 1950s, it was possible to produce low oil corn having less than one percent oil by weight and high oil corn having greater than 15% oil. Currently, high oil corn hybrids are commercially available that contain up to about 8% oil. The value of the oil is dependent upon the nature of the bio-based source. For example, peanut oil and olive oil may have substantial value as food products. However, many bio-based oils derive their value from their capacity to serve as a fuel; for example, bio-diesel is a transesterification product of triglycerides, primarily obtained from soy, which has become a significant fuel source. Oil from the byproduct stream of the bio-based production of ethanol may be a secondary product stream providing additional value to the overall process, so long as the cost of obtaining the oil is below the value derived.

Production facilities for bio-based ethanol generation have a clear focus on ethanol as the core product. However, the byproduct streams may provide an important and significant revenue stream that provides additional economic incentive for production growth. In particular, dried distillers grains with soluble (DDGS) has been the primary byproduct from these production facilities and its use as a feedstock for animals has become important to the feed market. A production facility using corn as feedstock may produce almost 3 gallons of ethanol and almost 20 lbs. of distiller's grains with solubles (dry basis) per bushel of corn. While valuable, increasing the value of this byproduct stream enhances the overall value of the ethanol production process. One manner of improving the value of the byproduct stream is the extraction of oil from this stream for either food or fuel use.

The DDGS byproduct stream is currently used as feed for animals; in particular, DDGS is feed for livestock such as ruminants. As such, the oil content has value as a component of the feed. The value of this byproduct has increased in response to the demand on the corn supply by ethanol production. In particular, as greater proportions of the corn supply are used to produce ethanol, the price of corn has increased and the value of feed supplements, such as DDGS, has also risen. While DDGS is useful as a feed supplement, its inclusion at high levels does have a negative effect on the livestock. For example, dairy cows consuming high DDGS levels exhibit reduced milk fat production. High DDGS levels may also result in reduced conception rates. Increased soft fat in pork and bacon and reduced weight gain in beef feedlot cattle have also been observed. These negative effects are correlated to the high oil content of DDGS; thus, removal of oil from the byproduct stream increases the utility of the resulting DDGS product while also generating another valuable byproduct stream, the oil.

In one popular method of removing the oil from the byproduct stream, mechanical forces are used to separate the oil from thin stillage. Generally, this method recovers oil by recovering whole stillage from the process used for producing the ethanol and mechanically processing the whole stillage to provide distillers wet grains and thin stillage. The thin stillage is concentrated by evaporation and heated under pressure to effectuate separation. The thin stillage is then treated with high temperatures and pressures prior to being separated into an aqueous phase and an oil phase through centrifugation.

While this approach is effective, useful, and experiencing significant commercialization, there are disadvantages associated with this method. One disadvantage is that the use of elevated temperatures and pressures requires additional energy expenditure. This expenditure is accompanied by the concomitant financial and environmental expense. Furthermore, extensive applications of heat and pressure may have deleterious effects on the remaining byproduct streams. For example, high temperatures and pressures may degrade (e.g. oxidize or hydrolyze) components of the thin stillage so that the resulting feed composition has a diminished value. Another limitation is that mechanical separation techniques have efficiencies directly related to the elevated temperatures, pressures, and mechanical force inputs. Thus, while inputting additional energy into the process generally increases yield, the return on investment calculation dictates that the removal remains somewhat inefficient. As such, substantial oil is left within the byproduct streams to maximize the cost-benefit of the extraction.

SUMMARY OF THE INVENTION

One aspect of the present invention involves a method of extracting oil from a byproduct stream of a bio-based ethanol production process. An oil concentrator is applied to the byproduct stream of the bio-based ethanol production process and mixed with the byproduct stream. The oil concentrator reduces interactions between the oil and oil sequestering components of the byproduct stream facilitating extraction of the oil from the byproduct stream.

Another aspect of the present invention involves an organic composition including an oil derived from a byproduct stream of a bio-based ethanol production process and an oil concentrator. The oil concentrator includes a compound having a hydrophilic group and a lipophilic group. These groups provide the oil concentrator a hydrophile-lipophile balance (HLB) of about 12 to about 18.

Other aspects and advantages of the present invention will be apparent from the following descriptions with reference to the drawings.

DETAILED DESCRIPTION OF PREFERRED EMBODIMENTS

Figure 1:
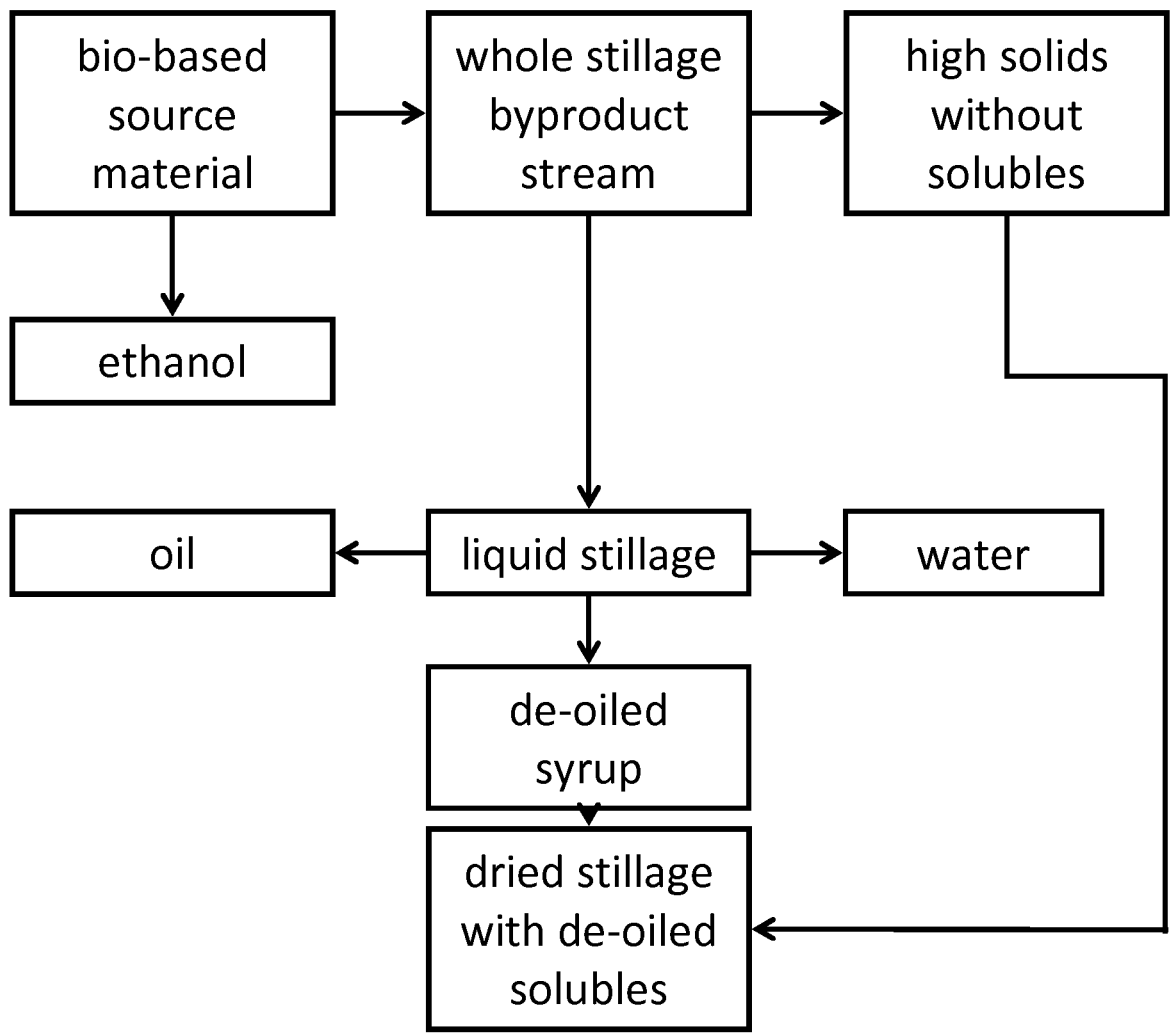
FIG. 1 is a schematic showing byproduct streams generated from the production of ethanol from a bio-based source material.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

It is desired to increase the value of byproduct streams from the production of ethanol from bio-based sources. One manner of increasing the value is to separate the oil, which has greater value as a separate byproduct stream, from the stillage stream. Another manner of increasing the value of the byproduct stream is to separate the oil from the stillage stream according to a method that enhances, or maintains, the value of the remaining stillage byproduct stream. Yet another manner of increasing the value of the byproduct streams is to enhance the efficiency by which the oil is separated from the byproduct stream. The use of an oil concentrator on the whole stillage byproduct stream or a secondary byproduct stream derived therefrom provides a means for increasing the value of the byproduct streams. As described herein, application of an oil concentrator to the byproduct stream increases the overall value of the byproduct streams so that the production of ethanol from the bio-based source returns greater value per quantity of source material used. In illustrative embodiments, a method of extracting oil from a byproduct stream of a bio-based ethanol production process comprises applying an oil concentrator to the byproduct stream of the bio-based ethanol production process, mixing the oil concentrator with the byproduct stream so that the oil concentrator reduces interactions between the oil and oil sequestering components of the byproduct stream, and separating the oil from the byproduct stream.

Referring to FIG. 1, a bio-based source material can be used to produce ethanol through several well known techniques. The production of ethanol generates a byproduct stream that includes those non-fermentable components of the source material. For example, a dry milling method for producing ethanol uses the starch in corn to produce ethanol through fermentation and creates a byproduct stream commonly referred to as "whole stillage." As further shown in FIG. 1, the whole stillage byproduct stream may be further separated into a high solids byproduct stream and a liquid stillage byproduct stream. In the exemplary production of ethanol from corn, this high solids byproduct stream is commonly referred to as "distillers wet grains" and the liquid stillage byproduct stream is commonly referred to as "thin stillage." The liquid stillage, depending on the nature of the bio-based source material, may contain significant quantities of valuable oil. The oil byproduct stream has been historically considered part of the byproduct stream that is not harvested and passed through the distiller's grain to produce animal feed products. The feed products are commonly distributed as distillers dried grains with soluble without a de-oiling step. However, as FIG. 1 shows, it is possible to separate oil from the byproduct stream while still passing the remaining solubles to the high solids byproduct stream to produce an animal feed product.

Figure 2:
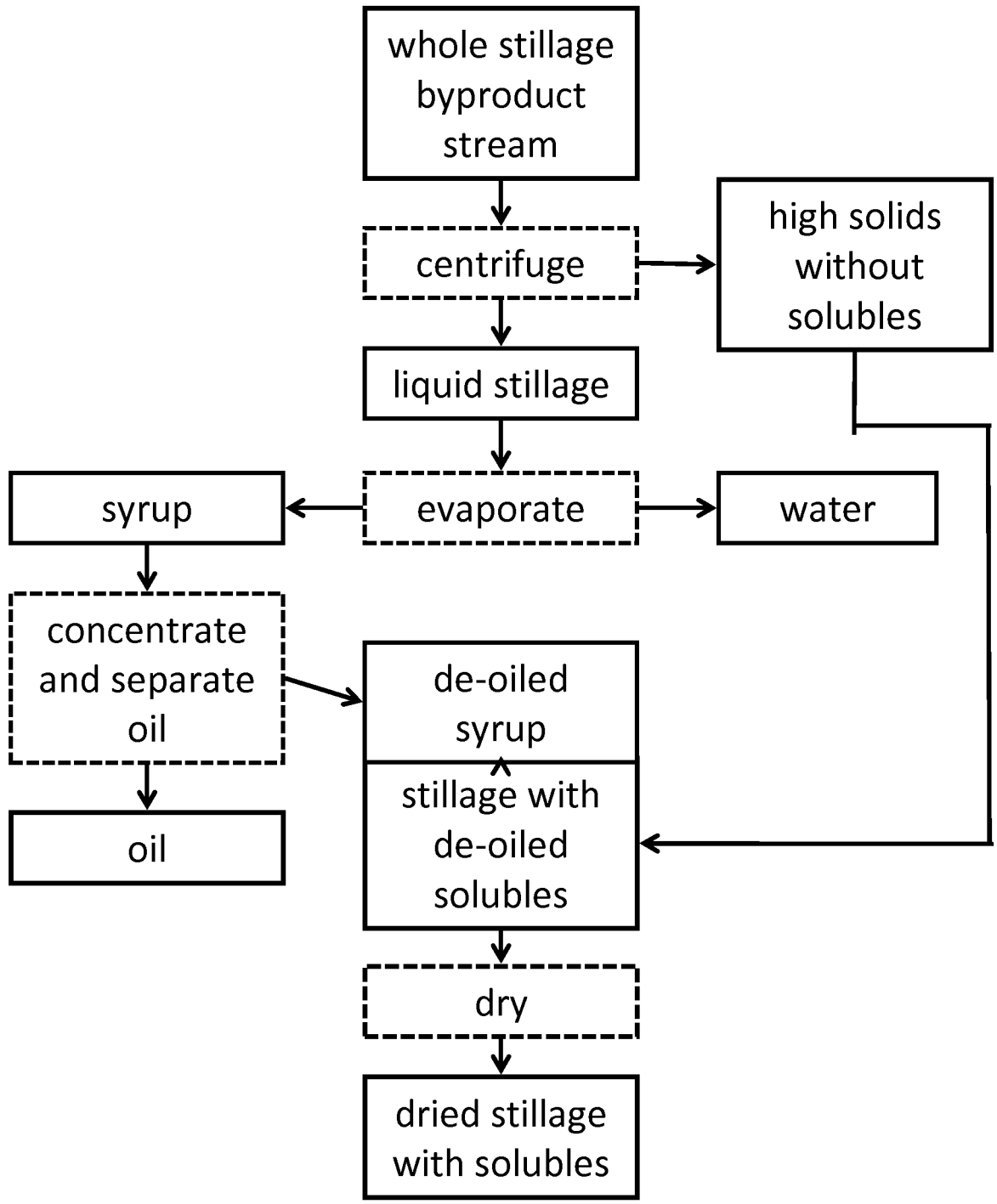
FIG. 2 is a schematic showing a method of extracting oil from the whole stillage byproduct stream from FIG. 1, showing process steps in dashed boxes and byproduct streams in solid line boxes.

FIG. 2 is a schematic showing a method of extracting oil from the whole stillage byproduct stream from FIG. 1. FIG. 2 shows the process steps in dashed boxes and byproduct streams in solid line boxes. While there are various processes useful for the separation of the whole stillage byproduct stream from the liquid stillage byproduct stream, centrifugation is commonly used. For example, a press/extruder, a screen centrifuge, a centrifugal decanter, a horizontal axis centrifuge, or a two-phase helical conveyor centrifuge may be used to separate the whole stillage into a high solids byproduct (approximately 35% solids; e.g. distillers wet grains) and a liquid stillage (approximately 8% solids; e.g. thin stillage). Currently, the liquid stillage is either concentrated through an evaporation step to create syrup or de-oiled and concentrated to create de-oiled syrup. Either of these syrup byproduct streams can be re-combined with the high solids byproduct stream and subsequently dried to produce animal feed. One aspect of the present invention is that the enhancement of the de-oiling process increases the amount of oil extracted from the liquid stillage stream while maintaining the value of the de-oiled syrup for addition to the high solids byproduct stream for drying.

Figure 3:
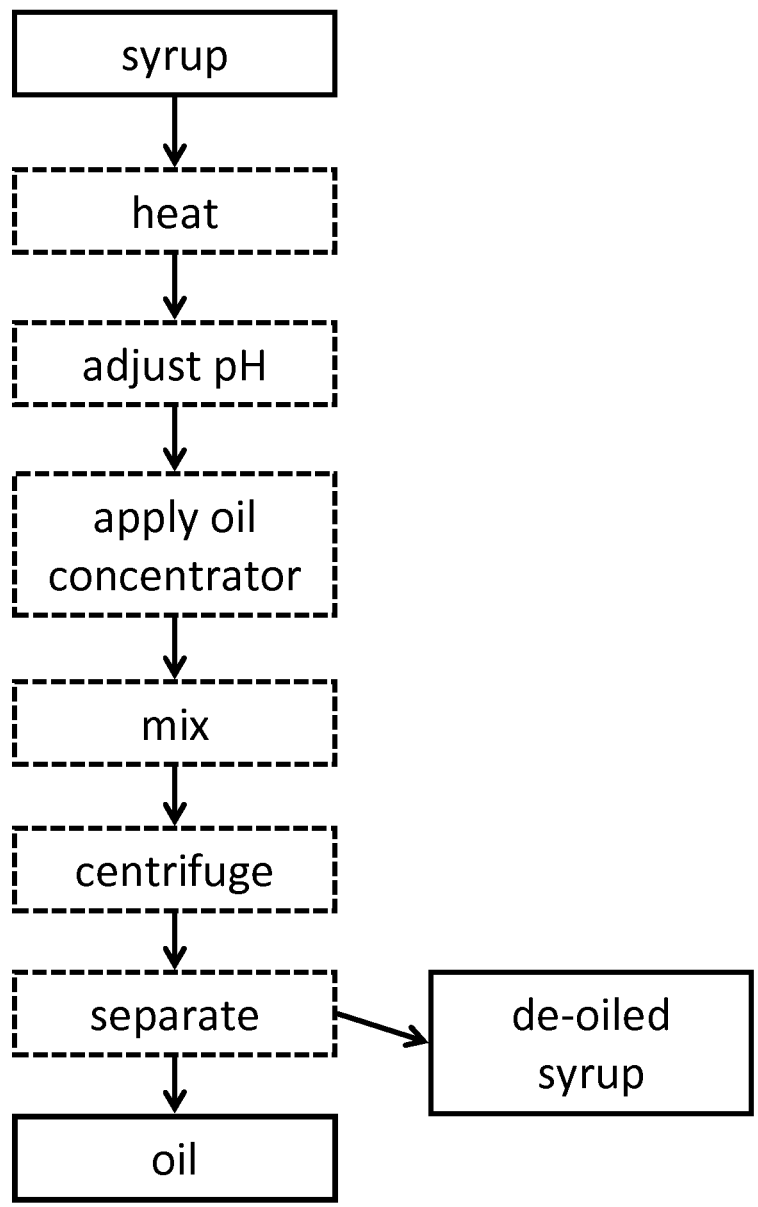
FIG. 3 is a schematic showing the concentrate and separate oil step shown in FIG. 2 with exemplary additional detail.

FIG. 3 shows illustrative process steps, according to one embodiment of the present invention, for processing syrup to produce de-oiled syrup and oil. While the prior art describes mechanical means for obtaining oil from a syrup, see for example U.S. Pat. No. 7,608,729, which is hereby incorporated by reference in its entirety, the present process includes applying an oil concentrator to the syrup to facilitate separation of the oil from the liquid. As shown in FIG. 3, according to one embodiment of the present invention, an oil concentrator may be applied to a syrup that has been heated (e.g. between 100° F. and 212° F.) and pH adjusted (e.g. between a pH of 3 and 7). The composition can then be mixed in a baffled tank or other mixing unit for a time sufficient for the oil concentrator to act on the sequestered oil. The mixture then may be passed through a centrifuge, for example, a disk stack centrifuge, so that the oil can be separated from the syrup.

Figure 4:
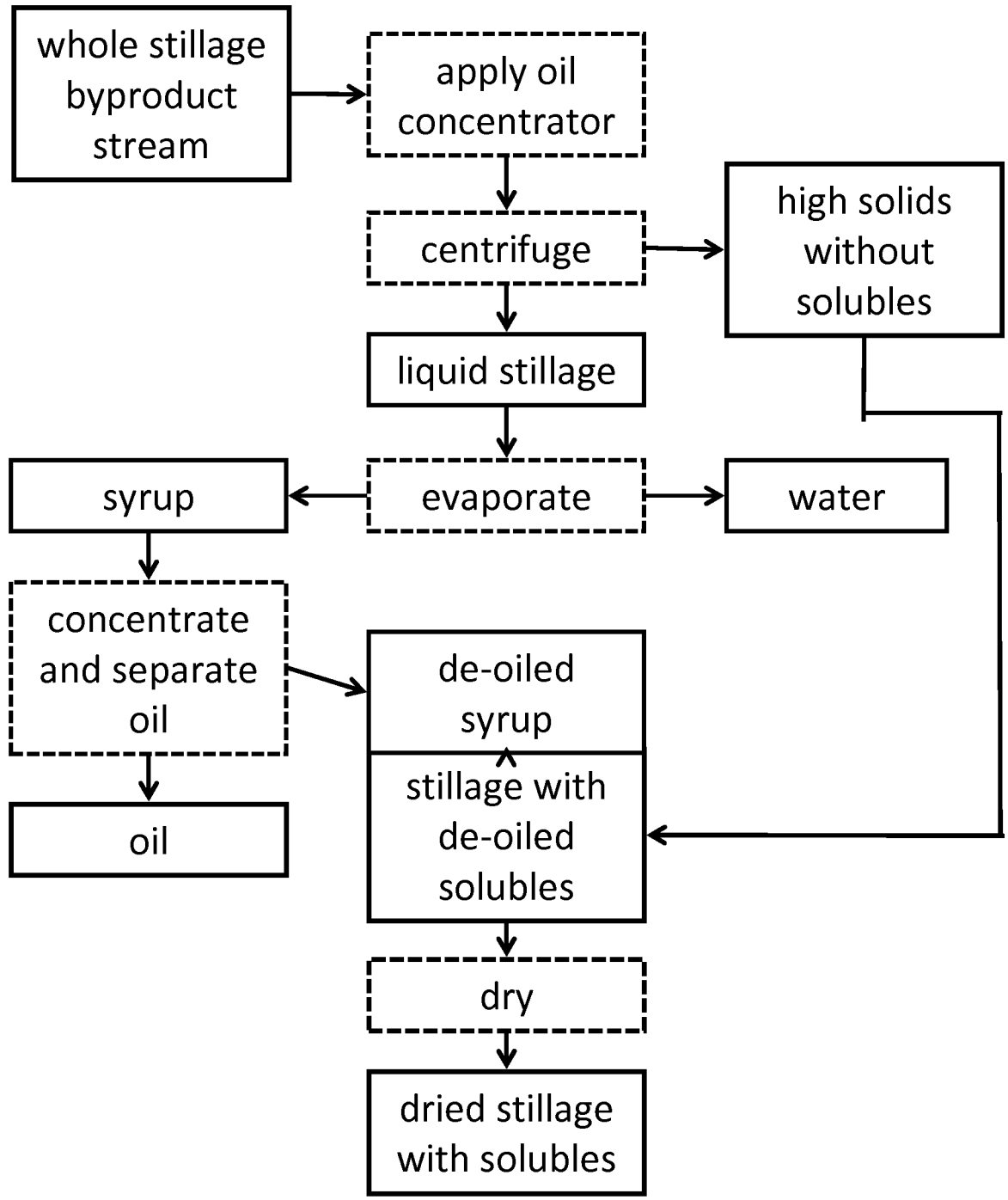
FIG. 4 is a schematic showing a second method of extracting oil from the whole stillage byproduct stream from FIG. 1, wherein the oil concentrator is applied directly to the whole stillage byproduct stream.

Referring now to FIG. 4, shown is a schematic detailing that the oil concentrator may be applied directly to the whole stillage byproduct stream prior to the whole stillage being separated into a high solids byproduct stream and a liquid stillage stream. The remainder of the process remains as shown in FIG. 2. Similarly, as shown in FIG. 3, the "concentrate and separate oil" step may or may not include a further addition of oil concentrator.

While not limited to any particular theory, it is believed that the oil concentrator functions through several pathways to promote the enhanced recovery of oil from the bio-based ethanol production process byproduct streams. One aspect of the present invention is that depending on the bio-based source, it is common for byproduct streams to include oil sequestering components that emulsify and/or stabilize the oil within the liquid solution. For example, a syrup byproduct stream may include soluble starches, proteins, gums, and waxes that interact with the oil (primarily triglycerides) to prevent its separation from solution. The molecular structure of a triglyceride includes a glycerol backbone with three fatty acids groups bound through ester bonds. Each of the fatty acid groups of a particular triglyceride can be composed of a variety of fatty acids with different molecular weights and lipophilicity. The overall oil profile may include a relatively diverse range of triglycerides having a diverse range of fatty acids bound thereon. The result is a potentially broad distribution of lipophilicity amongst the population of triglycerides that makes up the oil profile of a given source. Furthermore, the oil profile varies according to the source species, breed, and even with variable environmental and seasonal factors under which the source grew. The sequestering components interact with the triglycerides to prevent the triglycerides from interacting with each other in a manner which would result in the formation of a distinct oil phase. Instead, the oil tends to remain dispersed in the aqueous phase stabilized by the starches, proteins, gums, and waxes.

One aspect of the present invention is that it was discovered that an oil concentrator may be used to enhance oil recovery by interfering with the interaction between the naturally occurring oil sequestering components and the triglycerides so that the triglycerides are capable of interacting with each other so as to form a distinct oil phase. In illustrative embodiments, the oil concentrator comprises a surfactant compound having a hydrophilic group and a lipophilic group. The lipophilic group may be selected to have a higher affinity for the fatty acid groups of the triglycerides than the naturally present oil sequestering component. Thus, the triglycerides separate from the oil sequestering component. As used herein, this effect is referred to as a "detergent effect." Essentially, the detergent effect is a "washing" of the triglycerides from the starches, waxes, gums, and proteins that are included in the bio-based byproduct stream. The hydrophilic group provides solubility for the lipophilic group enabling aqueous solubility.

In addition to the detergent effect, the surfactant compound also acts in an interfacial capacity. In this capacity, the compound accumulates at the interface between the oil phase and the aqueous phase. As used herein, this effect will be referred to as the "interfacial effect." The interfacial effect enables the formation of oil droplets in an aqueous environment (i.e. an oil-in-water emulsion). One will appreciate that formation of an emulsion may be contradictory to the objective of separating the oil from the aqueous dispersion. In particular, some emulsions, once formed, are stable and prevent the separation of an oil and water mixture into discrete and separable phases. In fact, it was discovered that a number of compounds known for their exemplary detergent properties frustrated the extraction of oil from the byproduct streams. For suitability within the present invention, an oil concentrator will include compounds that exhibit a suitable detergent effect and an appropriate interfacial effect. As described above, many byproduct streams include starches, waxes, gums, and proteins. Not only do these components interfere with the evaporators and reduce evaporative efficiency, they reduce the efficiency by which high speed centrifuges are able to separate the oil from the liquid stillage. The presently described oil concentrator interacts with the oil, gums, and waxes to enhance separation of the oil from the stillage.

It was discovered that the hydrophile-lipophile balance (HLB) of a particular compound was a useful indicator for its efficacy as an oil concentrator. Typically, HLB numbers are associated with nonionic compounds that have both hydrophilic components and lipophilic components. This type of compound is often called a surfactant, a term derived from the phrase "surface active agent," because the compounds concentrate themselves and perform functions at surface interfaces. However, as used herein, the term HLB is not limited to its application to nonionic surfactants alone. While HLB has a specific meaning for nonionic surfactants, its meaning can be extrapolated to other compounds useful within the scope of the present invention. As such, HLB may be considered as a general indicator of the hydrophilicity and lipophilicity of a given compound, regardless of whether it is ionic or nonionic. While the term surfactant is used herein, it is intended to encompass the general functional definition of the term and not to represent a certain class of compounds having a particular structure. Compounds with a low HLB values are more lipophilic (lipid loving). These compounds may make water-in-oil emulsion (i.e. inverse-phase; e.g. hand cream) and have greater solubility in non-polar solvents (e.g. oil) than high HLB compounds. High HLB value compounds are more hydrophilic (water loving) and tend to make oil-in-water emulsions (i.e. normal-phase; e.g. milk). These compounds tend to be more soluble in polar solvents (e.g. water).

HLB values for a particular compound are determined by dividing the hydrophilic molecular weight percentage of the compound by 5. For example, if the compound has an average molecular weight of 1000 Daltons and the hydrophilic portion of that compound was 750 Daltons, the hydrophilic molecular weight percentage would be 75 and the HLB would be 15. Furthermore, each application has a particular HLB requirement. However, with respect to HLB values for certain applications, it should be noted that HLB requirements for most applications are calculated based on the concept that the end goal is a stabilized emulsion. That is, most HLB requirement calculations and experiments establish the HLB for making a stable emulsion between a non-polar and polar substance. For example, the HLB requirement for corn oil in water has been determined to be 10. Thus, a surfactant having a HLB of 10 is likely to form a stable emulsion of corn oil in water. As described herein, the present invention does not rely on forming a stable emulsion; rather, the oil concentrator should provide stabilization and attraction to the oil enabling the oil to be withdrawn from the byproduct stream (detergent effect) while still forming an emulsion with marked instability so that the oil is easily separable from the aqueous phase.

In illustrative embodiments, a method of extracting oil from the byproduct stream of the bio-based ethanol production process includes applying an oil concentrator comprising a surfactant compound having a hydrophilic group and a lipophilic group providing the oil concentrator a hydrophile-lipophile balance (HLB) of about 10 to about 19; preferably, from about 12 to about 18; more preferably, from about 14 to about 16; and even more preferably, around 15. A list of HLB values for various surfactants is available in many references such as the "The HLB System: a timesaving guide to emulsifier selection" a publication of ICI United States, which is hereby incorporated by reference in its entirety for disclosure related to HLB values. A mixture of surfactant compounds takes the weighted average of the HLB values of the individual compounds (e.g. $HLB_a*$(% $weight_a$)+$HLB_b*$(% $weight_b$)=$HLB_m$, where $HLB_m$ is the HLB of the mixture). In one embodiment, the oil concentrator includes two or more compounds that provide an HLB value described herein. In further embodiments, the oil concentrator includes an ionic surfactant which exhibits a detergent effect and an interfacial effect like a nonionic surfactant having an HLB value as described herein.

In illustrative embodiments, an oil concentrator comprises a surfactant compound having a hydrophilic group. In one embodiment, the hydrophilic group is an oligomeric or polymeric synthetic hydrophilic group. Exemplary hydrophilic groups including polyethylene oxide (e.g. a polyethylene glycol), a polyhydroyl (e.g. polyvinylalcohol), a polyamide (e.g. polyacrylamide), a polysulfonic acid (e.g. polystyrene sodium sulfonate), and/or a polycarboxylic acid (e.g. polyacrylic acid). In one embodiment, the oligomeric or polymeric synthetic hydrophilic group has between about 2 and about 40 repeating unit; preferably, between about 3 and about 20 repeating units; more preferably, between about 3 and about 10 repeating units. In another embodiment, the hydrophilic group is an oligomeric or polymeric naturally-occurring hydrophilic group. Exemplary naturally-occurring oligomeric or polymeric hydrophilic groups include polysaccharides, polyamino acids, polypeptides, and poly(hydroxycarboxylic) acids. In another embodiment, the hydrophilicity is provided by an ionic moiety (e.g. a dissociated acid, base, or salt).

In illustrative embodiments, an oil concentrator comprises a surfactant compound having a lipophilic group. In one embodiment, the lipophilic group is an alkyl that is optionally substituted, and/or optionally heteroatomic, and/or optionally conjugated, and/or optionally cyclic. In one embodiment, the lipophilic group may be the ester of a fatty acid (e.g. propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, lacceroic acid, psyllic acid, geddic acid, ceroplastic acid, hexatriacontylic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid). In one embodiment, the lipophilic group is an alcohol. In another embodiment, the lipophilic group is an ethoxylated alcohol.

In illustrative embodiments, the oil concentrator includes a polyethylene oxide and a fatty acid selected so that the HLB is about 10 to about 19; preferably, from about 12 to about 18; more preferably, from about 14 to about 16; and even more preferably, around 15. In another embodiment, the oil concentrator includes a polyhydroxyl compound having an ester linkage to at least one fatty acid and to at least one polyethylene oxide. In another embodiment, the oil concentrator includes a glycerol or sorbitol having an ester linkage to at least one fatty acid and at least one polyethylene oxide.

One aspect of the present invention is that corn oil is a triglyceride that can be converted into a surfactant through esterification reactions with one or more hydrophilic compounds. The byproduct of these reactions would be a monoalkylester of the fatty acid that is a nonionic surfactant compound. According to illustrative embodiments, a method of concentrating the oil from a bio-based production of ethanol includes using the oil derived from the bio-based source as a feedstock for the manufacturing of additional oil concentrator, in a loop to extract additional oil. This process may include the addition of a reactive hydrophilic moiety that provides the fatty acid ester derived from the triglyceride with an HLB value as described herein.

Another aspect of the present invention is that both the oil and the de-oiled byproduct stream may be consumed by an animal (human or livestock). The oil concentrator, having both hydrophilic and lipophilic groups, will have at least limited solubility in both the aqueous and the oil phases during a separation. As such, both the oil phase and the aqueous phase will include amounts of the oil concentrator.

In illustrative embodiments, an organic composition comprising oil derived from a byproduct stream of a bio-based ethanol production process and an oil concentrator, the oil concentrator comprising a surfactant compound is described. In one embodiment, the organic composition comprises triglycerides. In another embodiment, the oil concentrator comprises a fatty acid ester of a sorbitol modified with a polyethylene oxide. In another embodiment, the oil concentrator comprises about 1 ppm to about 10000 ppm of the organic composition; preferably, about 10 ppm to about 5000 ppm of the organic composition; more preferably, about 10 ppm to about 1000 ppm of the organic composition; and even more preferably, about 50 ppm to about 1000 ppm of the organic composition. In one embodiment, the oil concentrator is edible. In another embodiment, the food additive is usable in animal feed and drinking water. As described above, both the aqueous and oil byproduct streams may be used for animal feed. As such, the oil concentrator used would ideally not impart an unsafe additive into either byproduct stream. As such, those compounds approved under FDA Part 172, describing food additives permitted for direct addition to food for human consumption, and FDA Part 573, food additives permitted in feed and drinking water of animals, are particularly preferred; both references are hereby incorporated by reference in their entirety.

EXAMPLES

Table 1 shows a number of commercially available surfactants tested to establish those properties that facilitate an understanding of the factors relating to the selection of a particular surfactant for use within the scope of the present invention.

TABLE 1

| Trade Name | General Name | CAS Number | HLB | Oil | Aq. | % Oil |
|---|---|---|---|---|---|---|
| Lumisorb ® PSML-80† | Polyoxyethylene (80) sorbitan monolaurate | 9005-64-5 | 19.4 | 0.5 | 39.5 | 1 |
| Lumisorb ® PSMO-20† | Polyoxyethylene (20) sorbitan monooleate | 9005-64-5 | 15 | 7 | 33 | 17.5 |
| Lumisorb ® SML-K† | Sorbitan monolaurate | 1338-39-2 | 8.6 | 0 | 40 | 0 |
| Lumisorb ® PSTO-20† | Polyoxyethylene (20) sorbitan trioleate | 9005-70-3 | 11 | 5 | 35 | 12.5 |
| Span ® 80‡ | Sorbitan monooleate | 1338-43-8 | 4.6 | 0 | 40 | 15 |
| Surfonic ® N-400 | Polyethoxylate (40) of nonylphenol | 9016-45-9 | 17.8 | 0 | 40 | 0 |
| Surfonic ® N-300 | Polyethoxylate (30) of nonylphenol | 9016-45-9 | 17.1 | 0 | 40 | 0 |
| Surfonic ® N-150 | Polyethoxylate (15) of nonylphenol | 9016-45-9 | 15 | 6 | 34 | 15 |
| Surfonic ® N-95 | Polyethoxylate (9.5) of nonylphenol | 9016-45-9 | 13.1 | 6.5 | 33.5 | 16 |
| Surfonic ® N-60 | Polyethoxylate (6) of nonylphenol | 9016-45-9 | 10.9 | 0 | 40 | 0 |
| Surfonic ® N-40 | Polyethoxylate (4) of nonylphenol | 9016-45-9 | 8.9 | 0 | 40 | 0 |
| Surfonic ® CO-25 | Polyethoxylate (25) of castor oil | 61791-12-6 | 10.7 | 2 | 38 | 5 |
| Palmolive ® | Ammonium $C_{12-15}$ Pareth Sulfate and Lauramidopropylamine Oxide | N/A | UNK | 0 | 40 | 0 |
| None | N/A | N/A | N/A | 4 | 36 | 10 |
| None | N/A | N/A | N/A | 3 | 37 | 7.5 |
| None | N/A | N/A | N/A | 4 | 36 | 10 |

†Lumisorb is a registered trademark of Vantage Specialties, Inc.
‡Span ® is a registered trademark of Croda International PLC.
[4]Surfonic ® is a registered trademark of Huntsman Corporation.
[5]Palmolive ® is a registered trademark of Colgate-Palmolive.

Figure 5A:
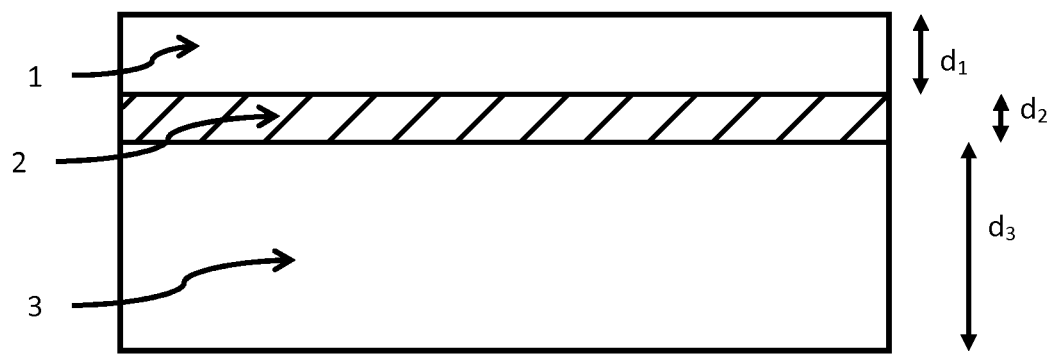
FIG. 5(A-B) are schematics showing the layering of the aqueous layer, the rag layer, and the oil layer which occurs with (FIG. 5A) and without (FIG. 5B) applying an oil concentrator.
Figure 5B:
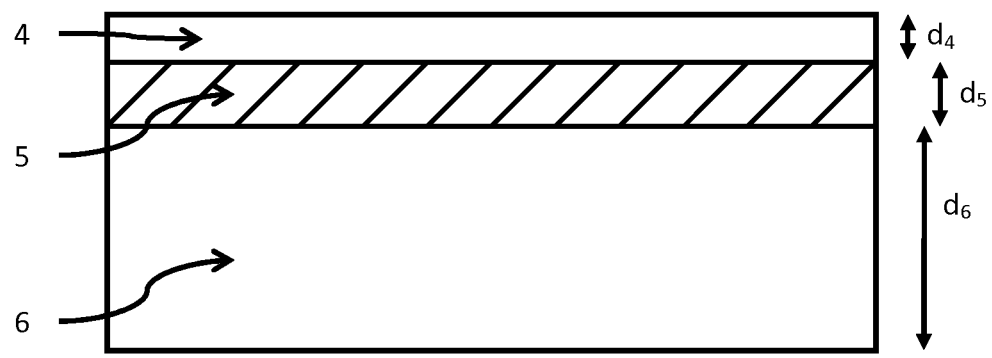

For each exemplary surfactant, the surfactant was used alone as the oil concentrator at a concentration of 5000 ppm in a 40 mL sample of liquid stillage obtained from a dry mill ethanol production facility using corn as the source material. The surfactant was applied to the liquid stillage and mixed at 212° F. As the exact quantity of oil in the 40 ml sample was not determined, the efficacy of the surfactants as oil concentrators was compared against the benchmark of a mechanical separation. Each of the three samples labeled "None" were processed without an oil concentrator. In each case, the experimental conditions were like the industrial process described in U.S. Pat. No. 7,608,729, referred to above. The column designated as oil indicates the ml of oil that was separable after centrifugation of the 40 ml sample. The column designated "Aq." includes the portion of each sample, in ml, that was not separably an oil layer. In particular, the Aq. phase includes both the rag layer and the aqueous layer. Rag layer is a term of art used to describe the emulsion layer. The emulsion layer is an aqueous solution in which micro- to nano-drops of oil are dispersed. The droplets are typically thermodynamically unstable, but can persist for such long periods of time (months-years) that in an industrial process, they can be considered stable. When no surfactant was used, about 3.5 ml of oil was separable from the 40 ml of solution as a layer of oil formed on the top of a centrifuge tube. Referring now to FIG. 5(A-B), shown is a cross-sectional schematic view showing the three layers that form in a centrifuge with (FIG. 5A) and without (FIG. 5B) the inclusion of effective oil concentrator. After the oil concentrator is applied to the liquid stillage, the sample is mixed so as to allow sufficient time for the oil concentrator to interfere with the sequestration of the oil by the naturally occurring components of the stillage. After that time, the sample is centrifuged, which causes the oil phase to separate from the aqueous phase according to the difference in density. Application of the oil concentrator enables the separation of oil layer 1, rag layer 2, and aqueous layer 3.

Without application of the oil concentrator, oil layer 4, rag layer 5, and aqueous layer 6 form upon centrifugation. As represented by FIG. 5, a larger quantity of oil is observed with application of the oil concentrator. This is representatively shown in FIG. 5 as $d_1$ is greater than $d_4$. Because the volume is, for the most part, conserved the sum of $d_2$ and $d_3$ ($d_2+d_3$) is smaller than the sum of $d_5$ and $d_6$ because oil in rag layer 5 and aqueous layer 6 contributes to the observed volume of that layer. One aspect of the present invention is that the addition of the oil concentrator results in $d_1$ being greater than $d_4$ ($d_1>d_4$).

One observation evident from Table 1 is that only four of the listed surfactants contribute to an enhancement of oil recovery over the benchmark. In particular, the use of polyoxyethylene (20) sorbitan monooleate, polyoxyethylene (20) sorbitan trioleate, polyethoxylate (9.5) of nonylphenol, and polyethoxylate (15) of nonylphenol as oil concentrators increased the volume of oil recoverable from the stillage while other surfactants confounded recovery. As such, selection of the oil concentrator is important as selection of an inappropriate oil concentrator may diminish recovery. The fact that corn oil has an HLB requirement of 10 in water (at concentrations less than or equal to 20%), would be an indicator that a surfactant having an HLB in the range of 10 would be a poor oil concentrator. In particular, the HLB requirement indicates that a surfactant having that HLB value would be capable of forming a stable emulsion. Thus, surfactants having an HLB of 10 would typically form a stable emulsion between corn oil and water. However, as stated herein, a stable emulsion does not enhance recovery and may actually confound recovery. This concept is captured in Table 1 as surfactants having HLB values of 8.6, 8.9, 10.7, and 10.9 each showed lower oil recovery than the benchmark, indicating that these surfactants contributed to the formation of stable emulsions. Also of note is that an attempt to use liquid detergent (Palmolive®) as an oil concentrator was also ineffective. It is presumed that the detergent effect was strong, but the interfacial effect was such that no oil was recoverable.

Table 2 shows the effect of the oil concentrator at various temperatures and concentrations.

TABLE 2

| Temp. | Conc. | Oil | Aq. | % Oil |
|---|---|---|---|---|
| 205 | 5000 | 5 | 35 | 12.5 |
| 205 | 4000 | 4 | 36 | 10 |
| 205 | 3000 | 4 | 36 | 10 |
| 205 | 2000 | 3.5 | 36.5 | 0 |
| 205 | 1000 | 2 | 38 | 5 |
| 205 | 0 | 0.2 | 39.8 | 0.5 |
| 190 | 5000 | 5 | 35 | 12.5 |
| 190 | 4000 | 4 | 36 | 10 |
| 190 | 3000 | 4 | 36 | 10 |
| 190 | 2000 | 3 | 37 | 7.5 |
| 190 | 1000 | 2 | 38 | 5 |
| 190 | 0 | 0 | 40 | 0 |
| 130 | 5000 | 3 | 37 | 7.5 |
| 130 | 4000 | 4 | 36 | 10 |
| 130 | 3000 | 3.5 | 36.5 | 8.75 |
| 130 | 2000 | 2 | 38 | 5 |
| 130 | 1000 | 1.8 | 38.2 | 4.5 |
| 130 | 0 | 0 | 40 | 0 |

For each example above, the experimental parameters described above with respect to Table 1 were used, except where noted. For this particular temperature and concentration analysis, polyoxyethylene (20) sorbitan monooleate was used alone as the oil concentrator. Note that the temperatures used in the oil recovery were all lower than shown in Table 1, as such, the benchmark oil recovery (Conc.=0 ppm) is substantially lower than shown above. For example, at 205° F., the recovery without an oil concentrator is 0.2 ml compared to an average of 3.5 ml recovered at 212° F., shown in Table 1. This highlights the importance of high temperatures when using only mechanical separation techniques. Several trends are observable from the data in Table 2. First, the improvement in recovery compared to the benchmark becomes substantially higher as the temperature decreases. Accordingly, it was discovered that oil could be recovered with higher efficiency at lower temperatures than previously described with the application of an oil concentrator. Furthermore, the introduction of greater concentrations of oil concentrator does not appear to linearly scale with the recovery of oil; instead, there appears to be a diminishing return as the concentration of oil concentrator is increased. This phenomenon is believed to be partly due to the fact that there is a limited amount of oil to recover and thus the % Oil recovery naturally approaches an asymptote at the total percentage of oil in the liquid stillage. It is also known that emulsion stability typically increases with surfactant concentration; thus, while enhancing the detergent effect, increasing concentrations of surfactant may create emulsions that are too stable for facile phase separation.

In illustrative embodiments, a method of extracting oil from a byproduct stream of a bio-based ethanol production process comprises applying an oil concentrator to the byproduct stream of the bio-based ethanol production process, mixing the oil concentrator with the byproduct stream at a temperature of about 100° F. to about 210° F. so that the oil concentrator reduces interactions between the oil and oil sequestering components of the byproduct stream, and separating the oil from the byproduct stream. In one embodiment, the temperature is about 130° F. to about 205° F. In another embodiment, the temperature is about 150° F. to about 200° F. One aspect of the invention is that the method of extracting oil from a byproduct stream of a bio-based ethanol stream using an oil concentrator enables the process to be performed at substantially lower temperatures than those taught in the prior art. The cooler process generates byproduct streams having fewer degradation effects. The liquid stillage stream is lighter in color when processed at lower temperatures and lighter colored liquid stillage has enhanced market value as feed. Furthermore, the cooler process saves energy costs. Another approach to extracting greater concentrations of oil is to use higher G values during centrifugation. While this carries both an energy and capital expense, it is believed that the use of an oil concentrator undermines any impetus to recover oil through increased G values in a similar manner as described herein with respect to increasing the temperature.

In illustrative embodiments, a method of extracting oil from a byproduct stream of a bio-based ethanol production process comprises applying an oil concentrator to the byproduct stream of the bio-based ethanol production process, mixing the oil concentrator with the byproduct stream at a concentration of about 500 ppm to about 10000 ppm so that the oil concentrator reduces interactions between the oil and oil sequestering components of the byproduct stream, and separating the oil from the byproduct stream. In one embodiment, the concentration applied to the stream is about 1000 ppm to about 5000 ppm. One aspect of the invention is that a preferred concentration of the oil concentrator will be dependent upon the selection and nature of the chosen oil concentrator. It may be economically feasible to use those concentrators derived from the esterification of the triglycerides separated from the byproduct stream at substantially higher concentrations (e.g. up to 20% by weight of total oil in the stream).

As described above, according to one aspect of the present invention, an oil concentrator is at least partially soluble in both an aqueous phase and an oil phase. Thus, the oil concentrator will partition into the two phases, in addition to concentrating at the interface, during phase separation. Thus, according to the solubility of the particular surfactant, the concentration in the aqueous and oil phase may be higher or lower than that concentration introduced into the byproduct stream. Detecting the use of an oil concentrator can thus be accomplished by analyzing either the oil byproduct stream or the aqueous byproduct stream which is typically added back to the high solids byproduct stream. Thus, the identification of an oil concentrator in a DDG or oil byproduct stream is indicative of its use within the production process.

In one embodiment of a method of extracting oil from a byproduct stream of a bio-based ethanol production process, the byproduct stream comprises an aqueous liquid byproduct stream with dissolved solids, and the amount of oil concentrator is such that the aqueous liquid byproduct stream includes about 50 ppm to about 4000 ppm of the oil concentrator, preferably about 500 ppm to about 2000 ppm of the oil concentrator.

In addition to increasing the amount of oil recovered from the byproduct stream, the de-oiled syrup byproduct stream recovered from the method is considered more valuable than the standard syrup including the oil. In particular, removal of the oil improves the efficiency of subsequent drying process (e.g. for generating dry distiller's grain from wet distiller's grain). Another aspect of the present disclosure is that the de-oiled liquid stillage including the oil concentrator exhibits enhanced processability. In particular, the oil concentrator may lower the interfacial tension of other components of the byproduct stream with water so as to enhance the processability of that byproduct stream. For example, the solubles (gums, waxes, proteins, starches, etc.) within a liquid stillage stream are known to make evaporation and drying more difficult. However, the oil concentrator, after facilitating oil recovery, will be left in the liquid stillage stream. This remaining oil concentrator then takes a role as process facilitator by enhancing evaporation and drying steps. In each of these steps, the oil concentrator affects solubility, phase separation, and viscosity of the remaining byproduct stream. One aspect of the present invention is that the oil concentrator, subsequent to aiding oil separation, aids further processing and lowers the overall energy demands of subsequently processing non-oil byproduct streams.

There are other known solutions for removing oil from grains. For example, soybeans, canola, sunflowers, cottonseed, peanuts, and other commodities are valued for their oils. For extracting oil from these grains, solvent extraction or extrusion have been used. While these same processes may be applied to the front end of an ethanol production process, that is, prior to distillation, many of the bio-based sources useful for ethanol production have oil levels which are too low to justify the expense of the front end process. Accordingly, those solutions to pre-distillation oil recovery are highly distinguishable from post-distillation processing. If for no other reasons, the byproduct stream from a distillation process has substantially different properties than a whole grain. Another solution for extracting oil from low oil bio-based sources is to fractionate the high oil portion of the source from the bulk (e.g. separation of the germ from the rest of the corn kernel for oil removal). Because the germ contains approximately 25% oil, the fractionation method is presently used for commercial corn oil production through the wet milling industry. Applying this separation technique to the bio-based production of ethanol is not presently implemented because the separation results in a concomitant starch loss which reduces the fermentable sugar content of the source. Since the bio-based fermentation industry's primary consideration is ethanol production, this concomitant loss is typically unacceptable. Thus, while there are known approaches to separating oil from bio-based source materials, those applied to the "front-end" are not applicable to the present disclosure.

Other known solutions for back-end recovery include solvent extraction methods. Exemplary solvent extraction methods include solvent extraction with hexane, benzene, ethanol, methanol, and supercritical carbon dioxide. However, as with the extruding techniques, which apply very high pressure and temperature to the source material to force oil out, solvent extraction carries a high cost compared with the relatively low amount of oil contained within a typical bio-based ethanol source material. Furthermore, solvent extraction may introduce toxic chemicals into the byproduct stream which would make it incompatible with use as an animal feed. Furthermore, solvent extraction extracts other soluble components, in addition to the oil, which may be undesirable in the oil but desirable in the de-oiled syrup. This would require further processing of the oil and a devaluation of the remaining de-oiled syrup.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of extracting oil from a byproduct stream of a bio-based ethanol production process under conditions in which there is an attraction between oil and oil sequestering components in the byproduct stream, the method comprising:

applying an oil concentrator to the byproduct stream of the bio-based ethanol production process with the byproduct stream at a pH between 3 and 7, wherein the oil concentrator is a surfactant compound having a hydrophilic group and a lipophilic group providing the oil concentrator a hydrophile-lipophile balance (HLB) of about 12 to about 18, wherein the lipophilic group is a fatty acid group and the hydrophilic group is a polyethylene oxide;

mixing the oil concentrator with the byproduct stream; and separating the oil from the byproduct stream, wherein said method is free of adding additional oil to the byproduct stream.

2. The method of extracting oil from the byproduct stream of the bio-based ethanol production process of claim 1, wherein the hydrophile-lipophile balance (HLB) is about 14 to about 16.

3. The method of extracting oil from the byproduct stream of the bio-based ethanol production process of claim 1, wherein the hydrophile-lipophile balance (HLB) is about 15.

4. The method of extracting oil from the byproduct stream of the bio-based ethanol production process of claim 1, wherein the byproduct stream comprises an aqueous liquid byproduct stream with dissolved solids.

5. The method of extracting oil from the byproduct stream of the bio-based ethanol production process of claim 4, wherein the byproduct stream comprises a thin stillage or syrup derived therefrom.

6. The method of extracting oil from the byproduct stream of the bio-based ethanol production process of claim 4, wherein adding the oil concentrator into the aqueous liquid byproduct stream includes adding an amount of oil concentrator so that the oil concentrator concentration is below a critical micellar concentration for the oil concentrator in the aqueous liquid byproduct stream.

7. A method of extracting oil from a byproduct stream of a bio-based ethanol production process under conditions in which there is an attraction between oil and oil sequestering components in the byproduct stream, the method comprising:

applying an oil concentrator to the byproduct stream of the bio-based ethanol production process with the byproduct stream at a pH between 3 and 7, wherein the oil concentrator is a surfactant compound having a hydrophilic group and a lipophilic group providing the oil concentrator a hydrophile-lipophile balance (HLB) of about 14 to about 16 and wherein the oil concentrator is an FDA acceptable direct food additive for humans and animals, said food additive selected from the group consisting of polyoxyethylene (20) sorbitan monostearate (Polysorbate 60), polyoxyethylene (20) sorbitan tristearate (Polysorbate 65), and polyoxyethylene (20) sorbitan monooleate (Polysorbate 80);

mixing the oil concentrator with the byproduct stream;

applying centrifugal force after mixing the oil concentrator with the byproduct stream to enable the formation of a separable oil phase and aqueous phase, wherein the oil concentrator is distributed between the oil phase and the aqueous phase: and separating the oil from the byproduct stream.

8. A method of extracting oil from a byproduct stream of a bio-based ethanol production process under conditions in which there is an attraction between oil and oil sequestering components in the byproduct stream, the method comprising:
evaporating water from the byproduct stream;
subsequently applying an oil concentrator to the byproduct stream of the bio-based ethanol production process with the byproduct stream at a pH between 3 and 7, wherein the oil concentrator is a surfactant compound having a hydrophilic group and a lipophilic group providing the oil concentrator a hydrophile-lipophile balance (HLB) of about 14 to about 16 wherein the oil concentrator is an FDA acceptable direct food additive for humans and animals, said food additive selected from the group consisting of polyoxyethylene (20) sorbitan monostearate (Polysorbate 60), polyoxyethylene (20) sorbitan tristearate (Polysorbate 65), and polyoxyethylene (20) sorbitan monooleate (Polysorbate 80);
mixing the oil concentrator with the byproduct stream;
separating the oil from the byproduct stream; and
drying the byproduct stream after said oil separating step to produce a distillers dried grains.

9. The method of extracting oil from the byproduct stream of the bio-based ethanol production process of claim 7, wherein the byproduct stream comprises an aqueous liquid byproduct stream with dissolved solids.

10. The method of extracting oil from the byproduct stream of the bio-based ethanol production process of claim 9, wherein the byproduct stream comprises a thin stillage or syrup derived therefrom.

11. The method of extracting oil from the byproduct stream of the bio-based ethanol production process of claim 9, wherein adding the oil concentrator into the aqueous liquid byproduct stream includes adding an amount of oil concentrator so that the oil concentrator concentration is below a critical micellar concentration for the oil concentrator in the aqueous liquid byproduct stream.

12. The method of extracting oil from the byproduct stream of the bio-based ethanol production process of claim 8, wherein the byproduct stream comprises an aqueous liquid byproduct stream with dissolved solids.

13. The method of extracting oil from the byproduct stream of the bio-based ethanol production process of claim 12, wherein the byproduct stream comprises a thin stillage or syrup derived therefrom.

14. The method of extracting oil from the byproduct stream of the bio-based ethanol production process of claim 12, wherein adding the oil concentrator into the aqueous liquid byproduct stream includes adding an amount of oil concentrator so that the oil concentrator concentration is below a critical micellar concentration for the oil concentrator in the aqueous stream.

* * * * *